Figure 1:
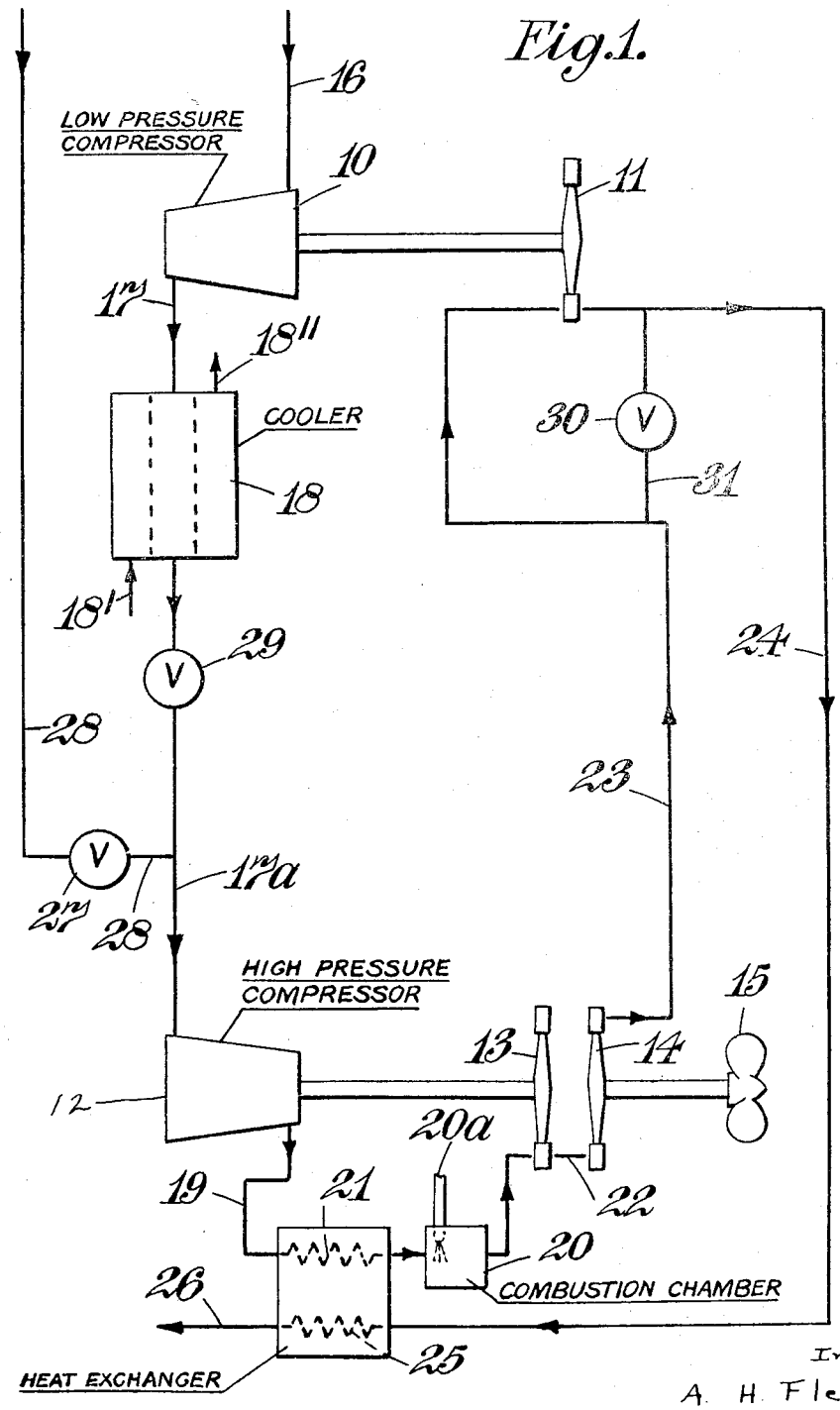

United States Patent Office 2,748,566
Patented June 5, 1956

2,748,566

COMPOUND GAS-TURBINE ENGINE WITH LOW-PRESSURE COMPRESSOR AND TURBINE BY-PASS

Arthur Holmes Fletcher, Derby, England, assignor to Rolls-Royce Limited, Derby, England, a British company Application June 25, 1953, Serial No. 364,096

Claims priority, application Great Britain July 2, 1952

8 Claims. (Cl. 60—39.16)

This invention relates to gas turbine engines and to methods of control of such engines. The invention is particularly concerned with engines of the compound type, hereinafter referred to as the type described, which comprise independently rotating high-pressure and low-pressure compressor/turbine systems, the low-pressure compressor system being connected to deliver to the high-pressure compressor system, and the high-pressure turbine system which drives the high-pressure compressor being connected to deliver its exhaust gases to the low pressure turbine system which drives the low-pressure compressor system, said engine further comprising means for delivering power to be absorbed externally of the engine.

The primary object of the present invention is to provide means for improving the fuel consumption of an engine of this type under low power operating conditions.

In accordance with the present invention, a method of controlling a gas turbine engine of the type described includes under low power running conditions the steps of by-passing the low-pressure compressor system to admit working fluid direct to the high-pressure compressor, and by-passing the low-pressure turbine system to prevent entry of part at least of the exhaust gases of the high-pressure turbine into the low-pressure turbine.

According to the invention moreover, a gas turbine engine of the type described includes first by-pass means operable to cut out the low-pressure compressor system from the flow path of the whole or a major part of the gas flow entering the high-pressure compressor system, and second by-pass means operable to divert from the low-pressure turbine system the whole or a major part of the exhaust gas flow which would otherwise enter the low-pressure turbine system.

The invention has important application in gas turbines of the open cycle kind in which air is normally drawn from atmosphere into the low-pressure compressor system, is compressed in the low-pressure and high-pressure compressor systems, is heated by the burning of fuel with it, and in which the heated air is passed to the high-pressure turbine system and thence to a low-pressure turbine system; in certain cases a power turbine system may be connected between the high-pressure and low-pressure turbine systems. In applying the invention to such an engine, controllable valve means is provided to permit air to be drawn directly from atmosphere into the high-pressure compressor system, and additional controllable valve means is provided on the downstream side of the high-pressure turbine system, or the downstream side of the power turbine system if the latter is located between the high-pressure and low-pressure turbine systems, such additional valve means being effective to by-pass the low-pressure turbine system, whereby the exhaust gas passes to atmosphere directly or through a heat exchange device which may be provided in the engine. For example such a heat exchange device may be effective to transfer heat from the exhaust gas flow to the air being delivered from the high-pressure compressor system to a combustion chamber. There may be associated with the controllable valve means by-passing the low-pressure compressor system an additional valve, which closes off the flow passage through the low-pressure compressor system when the by-pass is operative.

It has been found that the present invention enables the specific fuel consumption $$\left(\frac{\text{weight of fuel per hour}}{\text{shaft horse power}}\right)$$

to be improved under part-load operation of the engine. For example a compound gas turbine engine designed to give a maximum of say 10,000 H. P. may be required to give 1,000 H. P. for a major part of its operational running. Thus in such an engine it becomes important to ensure maximum fuel economy under the part-load operation.

Figure 2:
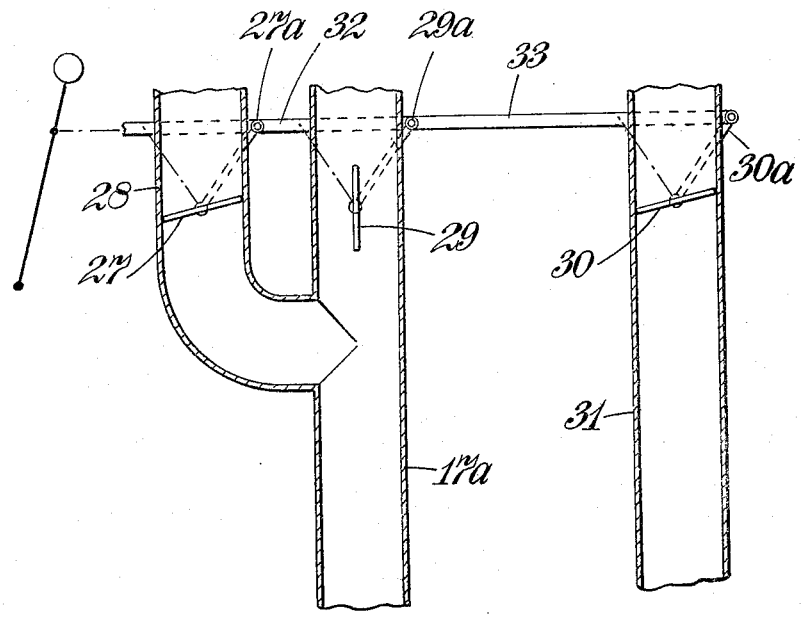

The following is a description of a preferred engine arrangement which is diagrammatically illustrated in the accompanying drawings. In the drawings:

Figure 1 illustrates the engine arrangement, and
Figure 2 illustrates a form of control for use in this arrangement.

Referring first to Figure 1 of the drawings, the low-pressure compressor system is shown at 10 driven by a low-pressure turbine system 11, whilst the high-pressure compressor system is shown at 12 driven by the high-pressure turbine system 13. The compressor and turbine systems may be of the axial flow kind and the turbine systems may each comprise one or more stages. In addition there is provided a power turbine system 14 from which power is absorbed externally of the engine for example by means of a marine screw diagrammatically illustrated at 15. The low-pressure compressor system draws in air through ducting 16 from atmosphere and delivers compressed air through ducting 17 to an intercooler 18 having a water-circulating matrix with inlet and outlet connections 18' and 18". The air flows from the intercooler 18 through ducting 17a to the high-pressure compressor 12.

The high-pressure compressor system 12 delivers compressed air through ducting 19 and a heat exchange device 21, to a combustion chamber 20 wherein fuel supplied through pipe 20a is burnt in the air. The hot side of the heat exchange device 21 is supplied with exhaust gas as described in greater detail below. The combustion chamber 20 is conveniently of the kind in which liquid fuel is introduced in an atomised state to burn with the compressed air, and it is connected so that the products of combustion pass therefrom to the high-pressure turbine system 13. The exhaust gas from the high-pressure turbine system 13 flows through ducting 22 to the power turbine system 14, from which the gases pass through ducting 23 to the low-pressure turbine system 11. The exhaust gases from the low-pressure turbine system pass through ducting 24 to the hot side 25 of the heat exchange device 21 and thence through exhaust ducting 26 to atmosphere.

The power of the engine will normally be controlled by regulating the supply of fuel to the combustion chamber 20.

The gas turbine cycle described above is well-known and the present invention provides apparatus for controlling the engine to obtain favourable specific consumption under part-load running conditions.

The invention provides in this preferred embodiment a valve device 27 in a by-pass duct 28 through which air can be drawn into the high-pressure compressor directly from atmosphere. The duct 28 thus by-passes the low-pressure compressor system 10 and the intercooler 18. The valve device 27 is intended to be controlled by movement from a fully-open to a fully-closed position, being opened to by-pass the low-pressure compressor. In addition there is preferably provided a valve device 29 in ducting 17a to close off the connection between the intercooler 18 and the high-pressure compressor system, the ducting 28 being connected to the ducting 17a downstream of the valve 29. As indicated in Figure 2, the valves 27 and 29 which are indicated as butterfly type valves, are preferably operated in unison, the valve 29 being closed as valve 27 is opened and vice versa, by interconnecting the operating arms 27a, 29a with a link 32.

In addition a valve device 30 is provided in a by-pass duct 31 connecting the ducting 23 with the ducting 24. This valve device 30, which is also shown in Figure 2 as a butterfly type valve, is opened when the valve device 27 is opened, providing free passage for gas flow from the ducting 23 to ducting 24. If desired a suitable interconnection may be provided in the control mechanisms of the valves 27 and 30; for instance a link 33 may be provided between the operating arm 30a of valve 30 and the operating arm 29a of the valve 29, the arm 29a being connected to arm 27a of valve 27.

I claim:

1. A gas-turbine engine comprising a working fluid duct having therein a low-pressure compressor, a high-pressure compressor, combustion equipment, a high-pressure turbine, a power turbine, and a low-pressure turbine respectively in flow series, said high-pressure turbine being drivingly connected to said high-pressure compressor, means for absorbing power drivingly connected to said power turbine, and said low-pressure turbine being drivingly connected to said low-pressure compressor, and said turbines being rotatable independently of one another, a first by-pass duct connected to the working fluid duct between the low-pressure compressor and the high-pressure compressor and adapted to by-pass the low-pressure compressor, first valve means in said first by-pass duct, a second by-pass duct connected to the working fluid duct between the power turbine and the low-pressure turbine and adapted to by-pass the low-pressure turbine, second valve means in said second by-pass duct, and means operable under low-power running conditions to open said first and second valve means, thereby to cut out the low-pressure compressor from the flow path of at least a major part of the working fluid entering the high-pressure compressor and to cut out the low-pressure turbine from the flow path of at least a major part of the working fluid exhausting from the power turbine, while retaining the power turbine in the flow path of the working fluid to be driven thereby.

2. A gas-turbine engine as claimed in claim 1 comprising also means for interconnecting said first and second valve means for simultaneous opening and closing.

3. A gas-turbine engine as claimed in claim 2, comprising also additional valve means in said working fluid duct upstream of the point of connection thereto of said first by-pass duct, said additional valve means being operative to close off the flow path through the low-pressure compressor when said first by-pass duct is operative.

4. A gas-turbine engine as claimed in claim 3, comprising also means to couple together the said additional valve means and said first valve means for simultaneous operation, the one to open while the other is being closed.

5. A gas-turbine engine comprising a working fluid duct having therein a low-pressure compressor having an inlet from atmosphere, a high-pressure compressor, combustion equipment, a high-pressure turbine, a power turbine, a low-pressure turbine, and exhaust duct means respectively in flow series, said exhaust duct means leading to atmosphere, said high-pressure turbine being drivingly connected to said high-pressure compressor, means for absorbing power drivingly connected to said power turbine, and said low-pressure turbine being drivingly connected to said low-pressure compressor, said turbines being rotatable independently of one another, a first by-pass duct connected to the working fluid duct between the low-pressure compressor and the high-pressure compressor, and connected at its other end to atmosphere, first valve means in said first by-pass duct, a second by-pass duct connected to the working fluid duct between the power turbine and the low-pressure turbine and connected at its other end to a discharge point so that fluid flowing in the second by-pass duct by-passes the low-pressure turbine, second valve means in said second by-pass duct, and means operable under low power running conditions to open said first and second valve means thereby to connect said high-pressure compressor directly to atmosphere, and to permit working fluid exhausting from the power turbine to flow to said discharge point without passing through the low-pressure turbine while retaining the power turbine in the flow path of the working fluid to be driven thereby.

6. A gas-turbine engine as claimed in claim 5 comprising also means interconnecting said first and second valve means for simultaneous opening and closing.

7. A gas-turbine engine as claimed in claim 6, comprising also additional valve means in said working fluid duct upstream of the point of connection thereto of said first by-pass duct, said additional valve means being operative to close off the flow path through the low-pressure compressor when said first by-pass duct is operative.

8. A gas-turbine engine as claimed in claim 7, comprising also means to couple together the said additional valve means and said first valve means for simultaneous operation, the one to open while the other is being closed.

References Cited in the file of this patent

UNITED STATES PATENTS

| 1,959,795 | Lysholm | May 22, 1934 |
| 2,529,973 | Sédille et al. | Nov. 14, 1950 |
| 2,621,475 | Loy | Dec. 16, 1952 |

FOREIGN PATENTS

| 541,307 | Great Britain | Nov. 21, 1941 |